United States Patent
Shrimpton

[11] Patent Number: 5,837,294
[45] Date of Patent: Nov. 17, 1998

[54] WINDSHIELD REPAIR TOOL WITH PRESSURE

[76] Inventor: Ronald J. Shrimpton, P.O. Box 8321, Saskatoon, Saskatchewan, Canada, S7K 6C6

[21] Appl. No.: 688,201

[22] Filed: Jul. 29, 1996

[30] Foreign Application Priority Data

Dec. 20, 1995 [CA] Canada ................................. 2165737

[51] Int. Cl.⁶ .................................................. B32B 35/00
[52] U.S. Cl. ................................. 425/12; 156/94; 264/36; 425/13; 425/171
[58] Field of Search ................................. 425/11, 12, 13, 425/171; 264/36; 156/94

[56] References Cited

U.S. PATENT DOCUMENTS

| | | |
|---|---|---|
| 4,032,272 | 6/1977 | Miller . |
| 4,200,478 | 4/1980 | Jacino et al. ............................. 156/94 |
| 4,291,866 | 9/1981 | Petersen ................................. 269/1 |
| 4,775,305 | 10/1988 | Alexander et al. . |
| 4,919,602 | 4/1990 | Janszen . |
| 4,919,603 | 4/1990 | Herold et al. ............................. 425/12 |
| 4,975,037 | 12/1990 | Freiheit ................................... 425/12 |
| 4,995,798 | 2/1991 | Ameter . |
| 5,122,042 | 6/1992 | Einiger ................................... 425/12 |
| 5,186,949 | 2/1993 | Lai ......................................... 425/11 |
| 5,234,325 | 8/1993 | Hill . |
| 5,328,649 | 7/1994 | Newsome ................................ 264/36 |
| 5,565,217 | 10/1996 | Beckert et al. ......................... 425/12 |
| 5,614,046 | 3/1997 | Campfield ............................... 156/94 |

Primary Examiner—Jay H. Woo
Assistant Examiner—Iurie A. Schwartz
Attorney, Agent, or Firm—Murray E. Thrift; Adrian D. Battison

[57] ABSTRACT

Windshield repair tool has an injector for injecting liquid resin into fractures and pits in broken windshields. The injector has an injector cylinder and a plunger that applies pressure to resin in the cylinder for injecting the resin into the fracture or pit. The plunger itself includes an outer sleeve and an inner plunger component biased forwardly in the outer sleeve by a coil spring. The pressure on the resin is monitored and can be controlled according to the amount that the plunger stem projects from the outer end of the plunger sleeve. This avoids insufficient or excessive filling of the fracture or pit.

11 Claims, 2 Drawing Sheets

WINDSHIELD REPAIR TOOL WITH PRESSURE

FIELD OF THE INVENTION

The present invention relates to the repair of windshields and the like.

BACKGROUND

Various devices have been used for injecting liquid resin into breaks in the outer layers of safety glass windshields for repairing the windshields. One of the major problems in making such a repair is controlling the amount of resin injected into the break. If too little resin is injected, there is an inadequate repair. If the injection is excessive, the laminations of the glass will separate as a lens of resin is formed between the glass layers.

The present invention is concerned with mitigation of this problem with prior art devices.

SUMMARY

According to the present invention there is provided a windshield repair tool of the type having an injector and means for mounting the injector on the windshield for injecting repair medium from the injector into a fault in the windshield, wherein the injector comprises:

- a hollow outer cylinder having outer and inner ends, a cylinder bore through the cylinder between the outer and inner ends, the cylinder bore defining an injection port at the inner end;
- a sleeve engagable in the cylinder bore, the sleeve having outer and inner ends and a sleeve bore through the sleeve between the outer and inner sleeve ends;
- a plunger extending along the sleeve bore and having a plunger head at an inner end thereof, between the sleeve and the injection port, and means sealing the plunger head to the through bore of the outer cylinder;
- resilient means biasing the plunger towards the injection port, the resilient means having a spring force that varies with displacement of the plunger along the sleeve;
- means for adjusting the position of the sleeve along the cylinder bore; and
- indicia displaying the quantity of displacement of the plunger in the sleeve against the force of the resilient means.

The displacement of the plunger in the sleeve is proportional to the pressure exerted on the resin by the plunger. When this pressure reaches a certain level, the repair has been completed and the further injection of resin will separate the glass laminations. Thus, the displacement of the plunger in the sleeve provides a mechanism for monitoring the resin pressure to ensure that the desired pressure is not exceeded.

In preferred embodiments, the mounting means include a suction cup carrying a cross arm with the injector at one end and an adjustable stop at the other. The stop and the injector cylinder are both threaded into bores in the cross arm so that the injector can be pressed firmly against a windshield to be repaired.

The sleeve is preferably threaded into the cylinder to provide the requisite adjustment of the sleeve along the cylinder. The plunger may include a stem extending along the sleeve from the plunger head to the outer end of the sleeve. The plunger can be biased towards the injection port by a coil spring on the stem, acting between the sleeve and the plunger head. A collar on the outer end of the stem limits forward travel of the plunger in the sleeve by engagement with the end of the sleeve. The indicia may be marked on the stem to be read at the outer end of the cylinder. This provides a direct reading of the spring compression, and thus the pressure on the resin.

In preferred embodiments, the mounting means include a suction cup carrying a cross arm with the injector at one end and an adjustable stop at the other. The stop and the injector cylinder are both threaded into bores in the cross arm so that the injector can be pressed firmly against a windshield to be repaired.

The sleeve is preferably threaded into the cylinder to provide the requisite adjustment of the sleeve along the cylinder. The plunger may include a stem extending along the sleeve from the plunger head to the outer end of the sleeve. The plunger can be biased towards the injector port by a coil spring on the stem, acting between the sleeve and the plunger head. A collar on the outer end of stem limits forward travel of the plunger in the sleeve by engagement with the end of the sleeve. The indicia are marked on the stem and are read at the outer end of the cylinder. This provides a direct reading of the spring compression, and thus the pressure on the resin.

BRIEF DESCRIPTION OF THE DRAWINGS

In the accompanying drawings, which illustrate an exemplary embodiment of the present invention.

DETAILED DESCRIPTION

Figure 1:
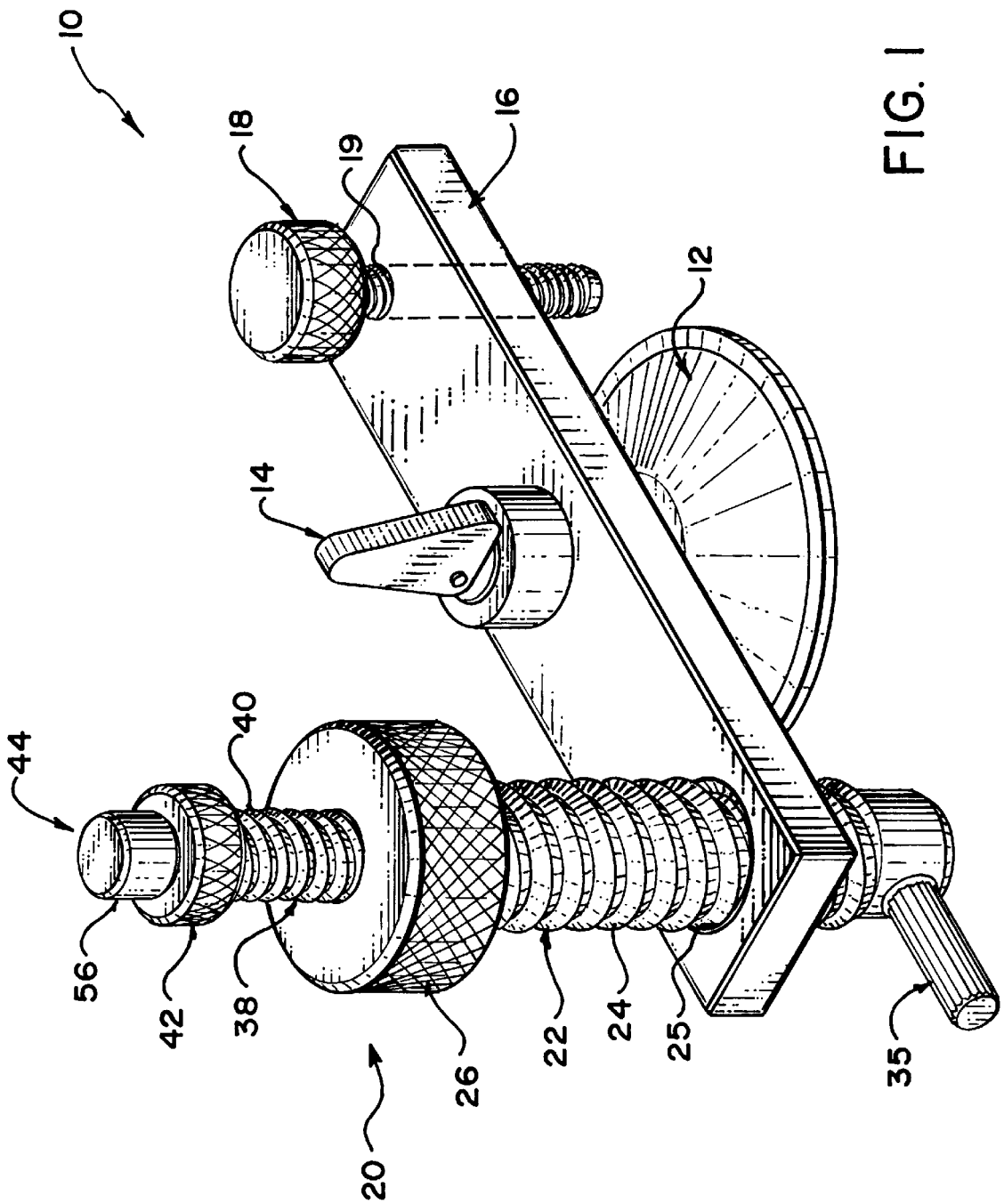
FIG. 1 is an isometric view of the tool according to the present invention.

Referring to the accompanying drawings, FIG. 1 illustrates sa tool 10 for the repair of windshields. It includes a suction cup 12 that has an actuating lever 14 for drawing the center of the cup away from a windshield on which it is seated to produce a reduced pressure zone inside the suction cup, thus holding the cup to the windshield. This configuration is conventional and consequently it will not be described in further detail.

The suction cup is attached to the center of a cross arm 16. At one end of the cross arm is a stop screw 18 threaded into a bore 19 through the arm. At the opposite end of the cross arm is an injector 20 that includes an outer cylinder 22 with an external thread 24 screwed into a bore 25 through the cross arm. An enlarged, knurled head 26 at the outer end of the cylinder is used for turning the cylinder.

Figure 2:
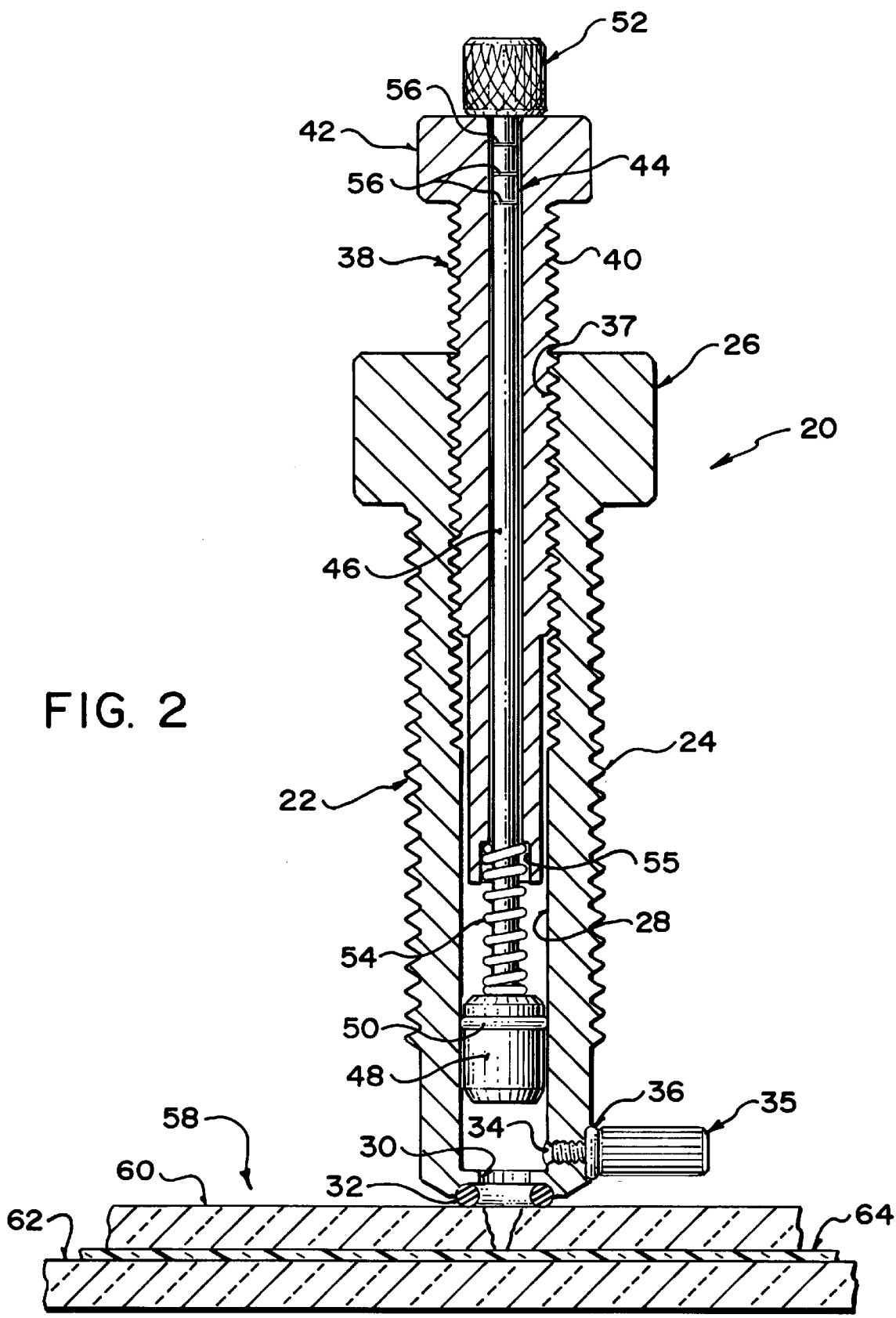
FIG. 2 is a longitudinal cross-section of the injector.

As illustrated in FIG. 2, the cylinder 22 has a cylinder bore 28 ending with an injection port 30 at an inner end of the cylinder. The port is surrounded by an O-ring seal 32. Immediately above the port 30 is a bleed port 34 normally closed by a threaded plug 35 with an O-ring seal 36. The through bore 28 of the cylinder has an internal thread 37 at its outer end.

A sleeve 38 extends partway along the bore 28 of the cylinder 22. It has a threaded section 40 that engages the internal thread 37 of the cylinder. The sleeve has a knurled head 42 at its outer end that enables the sleeve to be easily gripped by the fingers for rotation.

A plunger 44 has a stem 46 extending along the sleeve 38 and a plunger head 48 at the inner end, sealed to the bore 28 of the cylinder by an O-ring seal 50. A collar 52 on the outer end of the stem limits the forward travel of the stem in the sleeve. The plunger is biased inwardly in the sleeve by a coil spring 54 with a linear force versus compression characteristic. The spring surrounds the stem and acts between the plunger head 48 and the sleeve. The outer end of the spring is seated in a counter bore 55 in the end of the sleeve. Circumferential markings 56 surround the stem near its outer end and are visible at the outer end of the sleeve when the plunger head 48 is displaced towards the inner end of the sleeve against the force of the spring 54.

In use, the tool is placed on a windshield 58 (FIG. 2) having a cracked or pitted outer glass layer 60, an inner glass layer 62 and a plastic interlayer 64. The suction cup lever 14 is operated to fix the tool to the windshield with the injector port 30 of the injector positioned over the break to be repaired. The stop screw 18 and the injector 20 are then adjusted to bring the injector into firm engagement with the windshield at the point where resin is to be injected. The sleeve is then withdrawn from the cylinder 22 and liquid resin is deposited in the cylinder. The bleed port is opened and the sleeve is screwed into the cylinder. Once the plunger head 48 has reached the level of the resin, the bleed port is closed and the sleeve is screwed further into the cylinder to force the resin from the injector port into the break in the outer layer of glass. As pressure builds up on the resin, the reaction force on the plunger 44 will compress the spring 54, allowing the stem 46 to project from the outer end of the sleeve 38, with the amount of that projection depending on the pressure on the resin. When the indicia 56 on the stem indicate that the pressure has reached the desired level, threading of the sleeve into the cylinder is stopped and the repair process is completed.

While one embodiment of the present invention has been described in the foregoing, it is to be understood that other embodiments are possible within the scope of the invention and are intended to be included herein. The invention is to be considered limited solely by the scope of the appended claims.

What is claimed is:

1. A windshield repair tool having an injector and means for mounting said injector on the windshield for injecting repair medium from said injector into a fault in the windshield, wherein said injector comprises:

a hollow outer cylinder having outer and inner ends, a cylinder bore through said cylinder between said outer and inner ends, said cylinder bore defining an injection port at said inner end;

a sleeve engagable in said cylinder bore, said sleeve having outer and inner ends and a sleeve bore through said sleeve between said outer and inner sleeve ends;

a plunger extending along said sleeve bore and having a plunger head at an inner end thereof, between said sleeve and said injection port, and means sealing said plunger head to said through bore of said outer cylinder;

resilient means biasing said plunger towards said injection port, said resilient means having a spring force that varies with displacement of said plunger along said sleeve;

means for adjusting the position of said sleeve along said cylinder bore; and indicia displaying the quantity of displacement of said plunger in said sleeve against the force of said resilient means.

2. A tool according to claim 1 wherein said sleeve is threaded into said cylinder bore.

3. A tool according to claim 1 wherein said plunger comprises a stem extending the length of said sleeve and having said plunger head at one end thereof.

4. A tool according to claim 3 wherein said resilient means comprise a coil spring surrounding said stem and engaged between said plunger head and said sleeve.

5. A tool according to claim 1 wherein said indicia comprise at least one mark on said stem for alignment with an outer end of said sleeve.

6. A tool according to claim 1 including a bleed port in said cylinder communicating with said cylinder bore adjacent said injection port, and means for selectively closing said bleed port.

7. A tool according to claim 1 including seal means around said injection poll for sealing said port to a windshield surface.

8. A tool according to claim 1 wherein said mounting means comprise a suction cup, a cross arm secured to said suction cup and projecting in opposite directions therefrom, means adjustably mounting said injector on said cross arm to one side of said suction cup and a stop adjustably mounted on said cross arm on a side of said suction cup opposite said injector.

9. A tool according to claim 8 wherein said stop comprises a member threaded into a bore through said cross arm.

10. A tool according to claim 8 wherein said outer cylinder is threaded into a bore in said cross arm.

11. A tool according to claim 9 wherein said outer cylinder is threaded into a bore in said cross arm.

\* \* \* \* \*